US008352988B2

United States Patent
Cleary et al.

(10) Patent No.: US 8,352,988 B2
(45) Date of Patent: Jan. 8, 2013

(54) SYSTEM AND METHOD FOR TIME SHIFTING THE DELIVERY OF VIDEO INFORMATION

(75) Inventors: Geoffrey Alan Cleary, Ambler, PA (US); Michael C. Bertram, San Jose, CA (US)

(73) Assignee: Cox Communications, Inc., Atlanta, GA (US)

( * ) Notice: Subject to any disclaimer, the term of this patent is extended or adjusted under 35 U.S.C. 154(b) by 1410 days.

(21) Appl. No.: 09/994,583

(22) Filed: Nov. 27, 2001

(65) Prior Publication Data

US 2002/0174438 A1 Nov. 21, 2002

Related U.S. Application Data

(60) Provisional application No. 60/253,282, filed on Nov. 27, 2000.

(51) Int. Cl.
| | |
|---|---|
| *H04N 5/445* | (2006.01) |
| *H04N 7/16* | (2006.01) |
| *H04N 7/173* | (2006.01) |
| *H04N 5/76* | (2006.01) |

(52) U.S. Cl. .......... 725/58; 725/134; 725/142; 386/294; 386/297

(58) Field of Classification Search ............... 725/88, 725/14, 9, 97, 91, 101, 87, 58, 134, 142; 386/294, 297
See application file for complete search history.

(56) References Cited

U.S. PATENT DOCUMENTS

| | | | | |
|---|---|---|---|---|
| 5,371,532 | A * | 12/1994 | Gelman et al. | 725/88 |
| 5,606,359 | A * | 2/1997 | Youden et al. | 725/88 |
| 5,903,264 | A * | 5/1999 | Moeller et al. | 715/719 |
| 6,031,574 | A * | 2/2000 | Muller | 375/240.12 |
| 6,208,335 | B1 | 3/2001 | Gordon et al. | 345/327 |
| 6,543,053 | B1 * | 4/2003 | Li et al. | 725/88 |
| 2001/0051037 | A1 * | 12/2001 | Safadi et al. | 386/83 |
| 2003/0093792 | A1 * | 5/2003 | Labeeb et al. | 725/46 |
| 2003/0149988 | A1 * | 8/2003 | Ellis et al. | 725/87 |
| 2003/0163824 | A1 * | 8/2003 | Gordon et al. | 725/90 |
| 2003/0226150 | A1 * | 12/2003 | Berberet et al. | 725/94 |

OTHER PUBLICATIONS

U.S. Appl. No. 09/201,529, filed Nov. 30, 1998, Method and Apparatus for Simultaneously Producing Compressed Play and Trick Play Bitstreams From a Video Frame Sequence.
U.S. Appl. No. 09/293,526, filed Apr. 15, 1999, Data Structure and Methods for Providing an Interactive Program Guide.
U.S. Appl. No. 09/458,319, filed Dec. 10, 1999, Method for Reducing Latency in an Interactive Information Distribution System.

* cited by examiner

*Primary Examiner* — James R Sheleheda
(74) *Attorney, Agent, or Firm* — Merchant & Gould

(57) ABSTRACT

A method and apparatus providing time-shifted television within a video-on-demand system.

24 Claims, 11 Drawing Sheets

TIME SHIFT SCHEDULING

INITIATING DIVA CAPTURE TV SERVICE VIA NAVIGATOR

SYSTEM AND METHOD FOR TIME SHIFTING THE DELIVERY OF VIDEO INFORMATION

CROSS REFERENCE TO RELATED APPLICATIONS

This application claims benefit of U.S. Provisional Patent Application Ser. No. 60/253,282, which was filed on Nov. 27, 2000 and is incorporated herein by reference in its entirety.

BACKGROUND OF THE INVENTION

1. Field of the Invention

The present invention relates to an information distribution system such as a video-on-demand (VOD) system. More particularly, the present invention relates to a system and method for time shifting the delivery of video information to consumers requesting such information.

2. Description of the Background Art

VOD systems providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/IEC standards 13818, which is incorporated herein by reference in its entirety. Additionally, a compressed digital video system is described in the Advanced Television Systems Committee (ATSC) digital television standard document A/53, incorporated herein by reference.

The most important characteristic of a video on demand system is the experience of a user receiving content via that system. That is, a user ideally selects desired content and the system provides the desired content to the user in a timely manner and at a quality level consistent with the user's expectations. Failure to meet the user expectations in terms of image quality, sound quality, system latency or other factors results in a less than satisfying experience to the user.

The practice of "time shifting" within the context of a consumer television experience is commonly implemented by recording consumer-received content using a consumer recording device, such as a video cassette recorder (VCR), video tape recorder (VTR) or other mass storage device. The recorded content is then viewed by the consumer at a convenient time. That is, the time at which the content is view is shifted from the transmission or "live" time to some time in the future.

Unfortunately, present time shifting techniques are extremely limited. For example, the TIVO/ReplayTV techniques allows only a limited storage of information, while VCRs typically allow 2-8 hours of storage, depending upon selected tape speed/resolution. In addition, present consumer-side time shifting techniques require the use of a tuner/demodulator to provide video information to the mass storage device or other magnetic medium. Thus, in the case of a consumer utilizing a single tuner/demodulator to receive content, the consumer cannot simultaneously view and store content from different tuned signals.

SUMMARY OF THE INVENTION

The disadvantages heretofore associated with the prior art are overcome by the present invention of a system and method for time shifting the delivery of video information. More particularly, an information provider or server according to the present invention provides the ability to simultaneously record and provide interactive access to a very large number of broadcast content sources, such as all the broadcast content sources able to be received by a subscriber.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1A:
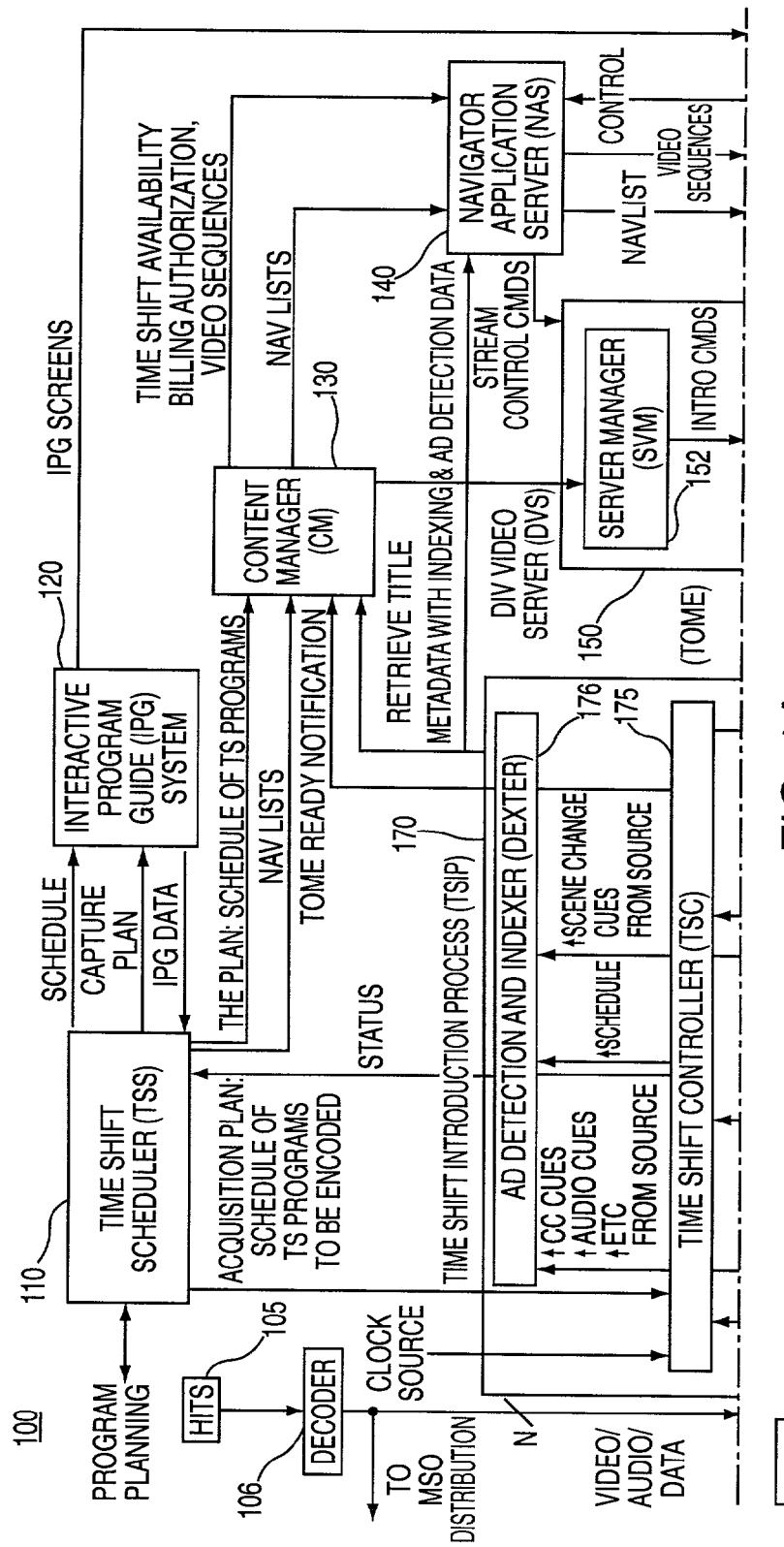
FIG. 1 depicts a Time Shift TV (TSTV) architecture according to an embodiment of the invention.

The present invention will be described within the context of an exemplary hardware and software architecture suitable for implementing a Time Shifted Television (TSTV) service. The Time-shifted TV service offers customers the ability to use VCR-like functions (such as fast forward, pause, and rewind) with a plurality of channels. The Time-shifted TV service is described as a service offering within the information on demand (IOD) system provided by DIVA Systems, Inc. of Redwood City, Calif. It will be appreciated by those skilled in the art that other IOD and video on demand (VOD) systems may be adapted in accordance with the teachings of this invention to likewise provide a Time-shifted TV service.

The described Time-shifted TV service optionally operates in two modes; namely a DIVA TV mode and a Capture TV mode. The DIVA TV mode gives users VCR-like access to a scrolling window of programs broadcast currently or recently on specific channels. The Capture TV mode offers users the ability to access and have VCR-like control over programs previously broadcast on a variety of channels.

Broadcast content is captured for subsequent time shifting from a plurality of sources. The broadcast content is processed to provide play tracks, fast forward tracks, rewind tracks and other tracks or files appropriate to the information distribution system. For example, in the case of an information distribution system utilizing a forward application transport channel (i.e., a high bandwidth communications channel adapted to delivering, e.g., video streams from servers to clients) supporting the transport of MPEG-2 formatted data, the acquired broadcast content is encoded into various tracks conforming to the MPEG-2 transport stream format. It is noted that MPEG-4, MPEG-7, MPEG-1, DVB and other formats may be utilized, depending upon the system architecture, distribution network architecture, subscriber set top terminal/set top terminal decoding architecture and the like.

The invention also comprises methods for encoding fast forward and rewind tracks in response to received broadcast content such that a subscriber viewing received broadcast content substantially in real time may activate fast forward and/or rewind track functionality within an interactive information distribution system. While a subscriber cannot fast forward received content past what is presently being broadcast, the subscriber may rewind to previously received content portions and subsequently fast forward back to a "live feed" of the broadcast content stream.

The interaction model supporting subscriber navigation within the interactive information distribution system, as well as content stream selection (including play, fast forward and rewind track selection) is also described herein. Briefly, in a navigation scenario, applets comprising video, graphics and control information are provided to a subscriber. The subscriber utilizes a pointing device, such as a remote control device, to selectively highlight graphical objects displayed upon the subscriber's display device and select particular graphical objects. The graphical objects may be associated with other graphical objects, other applets, other information streams and the like based upon information within the control layer of the presently utilized applet. Video information within the video layer is displayed to provide a contextual anchor for a user operating a remote control device, such that the navigation function provides an intuitive selection process to the user.

Figure 1B:
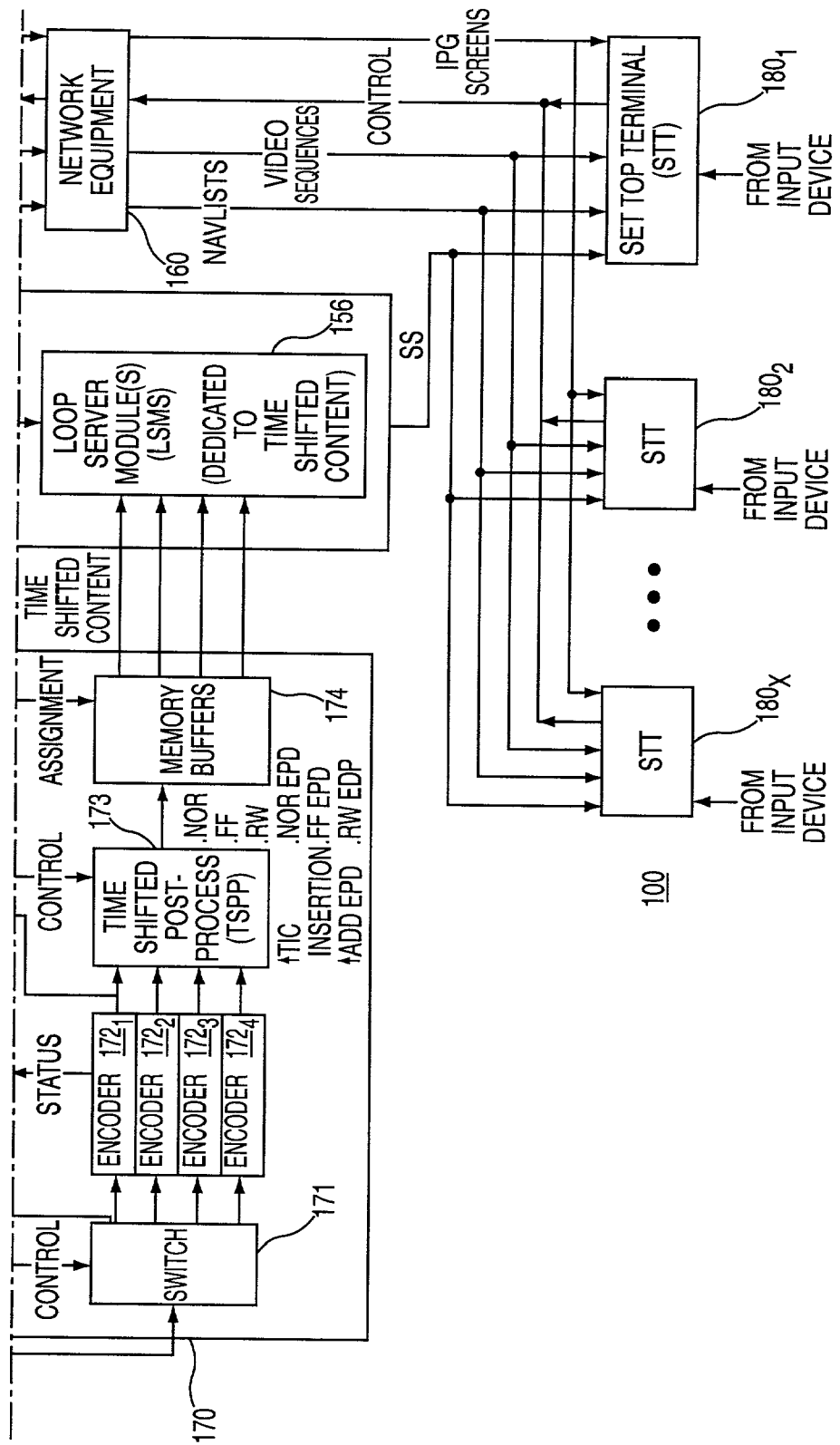

FIG. 1 depicts a Time Shift TV (TSTV) architecture according to an embodiment of the invention. Specifically, the TSTV architecture 100 of FIG. 1 comprises server-side equipment and subscriber-side (i.e., user) equipment. The TSTV architecture of FIG. 1 operates to process a plurality of received program or content streams (i.e., baseband broadcast video streams and related audio streams and data streams) such that a time shift feature may be provided to subscribers or users of an IOD or VOD system using the TSTV architecture.

The TSTV architecture will be described according to several major functions. First, the storage and delivery of content to users will be described. This function comprises the various elements needed to store content on a server and disseminate that content to users upon request. Next, the introduction and storage of time-shifted content will be described. This function comprises those elements adapted to retrieving broadcast content and storing the retrieved broadcast content on a server. Finally, the service function will be described. This function comprises those elements adapted to providing specific services to subscribers.

The server-side equipment comprises a time Shift Scheduler (TSS) 110, an Interactive Program Guide (IPG) system 120, a content manager (CM) 130, a Navigator Application Server (NAS) 140, a server such as a DIVA Video Server (DVS) 150, network equipment 160, and a functional element denoted as a Time Shift Introduction Process (TSIP) 170.

The subscriber-side equipment comprises a plurality of set top terminals (STTs) denoted as STTs $180_1$, $180_2$ and so on up to $180_x$ (collectively STTs 180). The STTs 180 receive broadcast and time shifted services. Each STT performs MPEG decoding as necessary. Each STT supports channel tuning (selecting a desired transport stream or "channel"), navigation (interacting with the server via a user interface), interactive program guide (IPG) processing (displaying graphical, video and control information supporting the IPG user interface), and customer control of time shifted services.

In response to a user request propagated via a control channel (i.e., a back channel), the server-side equipment provides an encoded content stream (i.e., a video sequence and related audio sequence) to the requesting user via a high bandwidth forward channel. The subscriber equipment receives the encoded content stream, decodes (and optionally decrypts) the content stream and displays the underlying content on a presentation device, such as a television or other video/audio presentation device.

Storage and Delivery of Content to Users

The server 150 stores a plurality of content streams, such as video content streams including associated audio content. It is noted that these content streams may include auxiliary program information, such as fast forward (FF) and rewind (RW) tracks or streams. A FF track comprises, effectively, a temporally sub-sampled version of a main program of the content stream. A RW track comprises, effectively, a reverse-ordered and temporally sub-sampled version of the main program of the content stream. Such FF and RW tracks are suitable for enabling FF and RW functionality in the information distribution system 100 of FIG. 1. That is, a subscriber may request that a presently presented program be "fast forwarded" or "rewound" to some future or previous point in the program at a rate of, e.g., 5 to 11 times the normal play rate. The server 150 responsively begins streaming the FF or RW track to the subscriber in response to the request.

The network equipment 160 comprises In-Band (IB) and Out-of-Band (OOB) equipment. The OOB network equipment supports out of band point-to-point and broadcast messaging between the NAS 140 and the STTs 180. Out of band communications are primarily used for management, navigation, and service control. In the embodiment of FIG. 1, the OOB network receives a control stream CONTROL from the STTs 180, and provides a navigation list NAVLISTS stream and various IPG streams IPGSCREENS to the STTs 180.

The in-band network equipment provides the modulation and frequency conversion necessary to transmit the server streams on, for example, a Hybrid Fiber Channel (HFC) network. The in-band network equipment also inserts tuning and node specific information into the, illustratively, MPEG transport streams. In band network equipment includes Transport Processing Modules (TPM), Digital Video Modulators (DVM) and other equipment. In the embodiment of FIG. 1, the IB network provides video streams and their associated audio streams VIDEOSEQUENCES to the STTs 180.

The TPM receives a set of MPEG transport streams from the Server across a fiber optic connection. The TPM adds PSI and private data to each transport stream in support of Set Top tuning operations. The transport streams are split up and each is sent on a separate serial electrical connection to a DVM. The DVM modulates each transport stream into a separate signal and then upconverts that signal to the proper transmission frequency. Those signals are then combined onto the HFC network and transmitted to the STTs.

The Interactive Program Guide (IPG) System 120 comprises a set of components that provide IPG services for the STTs 180. The IPG System 120 includes a guide data provider, video sources for ad windows, real time encoders, transport stream multiplexers, and digital video modulators.

The IPG System 120 builds multiple programming guide screens, each representing the programming schedule for a set number of channels over a set period of time. Those guide screens are combined with ad videos and encoded with one screen in each transport stream program. The programs are multiplexed into a multi-program transport stream along with supporting control and navigation data. The multiplexed transport streams are then modulated, upconverted, and broadcast to the STTs 180. The STTs 180 are able to tune those IPG screens and select individual programs from that screen. The screen is updated throughout the day to reflect the scrolling window of available DIVA TV content.

The IPG 120 provides a broadcast schedule to the TSS 110, which allows the program planner to select the programs or channels to be recorded. The IPG System 120 uses the Capture Plan provided by the TSS to include information in the IPG Screens indicating which programs are available for time shifted viewing. In this manner, the user may view those programs which will not be time-shifted, knowing that the time-shifted programs may be viewed at a later time. The IPG optionally maintains a history of previously broadcast time shifted content. IPG Screens of this archived content are also available via the STT for customer selection.

Exemplary IPG systems 120 are described in more detail in both U.S. Pat. No. 6,208,335, issued on Mar. 27, 2001, and U.S. patent application Ser. No. 09/293,526, filed on Apr. 15, 1999, both assigned to the same assignee as the present application, and both incorporated by reference herein.

The Content Manager (CM) 130 manages the acquisition and storage of time shifted content. The Content Manager (CM) 130 uses the Title Plan provided by the TSS 110 to coordinate the introduction of content between the TSIP 170 and the DIVA Video Server (DVS) 150. That is, the TSIP 170 is used for the input of time-shifted content and the encoding of that content (e.g., using MPEG-2, Dolby or other encoding formats) for introduction to the server 150. The Title Plan contains information identifying the programs to be time shifted, the start and stop times for those programs, the unique IDs and Navigator (NAV) list indices for each program, and the temporal availability window for each program.

The Navigator Application Server (NAS) 140 manages STT sessions and supports Set Top navigation. The NAS also manages dynamic Navigator (NAV) lists and supports play list processing during content streaming.

The CM 120 uses the Title Plan information to build and send NAV lists to the NAS 140. The NAS will use the list information to support viewer selection of time-shifted content via the Navigator and IPG screens. The NAV list information will be used by the NAS to support the implementation of DIVA TV windows. Video Sequences will provide the NAS with an ordered association between sequentially encoded titles. Dynamic updating of the NAV lists and Video Sequences will allow the CM to create a content availability window that scrolls over time.

The CM 130 communicates through a Server Manager (SVM) 152 within the server 150 to coordinate the content introduction from the Server side. The Server Manager 152 controls the introduction of content from the Server side, manages the content, and manages Server resources.

The Server Manager 152 comprises, illustratively, a Unix-based workstation that acts as a controller and content manager for the Server. The SVM acts as an intermediary between the Content Manager 130 and the Server 150 for content introduction and management commands. The SVM also acts as an intermediary between the Navigator Application Server 140 and the Server 150 for stream control commands.

The Server Manager 152 receives a series of Retrieve Title commands from the CM 130 based on the time shift Title Plan. Those commands cause the Server Manager to allocate space on the Server for the time-shifted content. Once space has been allocated, the Server will be ready to accept content for the new titles. Based on status from the Server, the Server Manager will notify the Content Manger when the first extent for each track has been written, when the last extent for each track has been written, and when a title has finished loading. The tracks are divided into a plurality of portions known as "extents" which are then stored. Each track has associated with it a first extent, a last extent and a plurality of intervening extents representing, respectively, the first, last and intervening portions of the track.

The Server Manager 152 receives stream creation, change, and modify commands from the NAS 140. The Server Manager accepts queued commands. Queued commands are sent by the NAS to tell the Server what title to stream when it has finished a currently executing streaming command. Queued commands provide low latency track transitions between DIVA TV titles.

The DIVA Video Server (DVS) 150 allocates storage space for time shifted content based on Retrieve Title commands sent from the Content Manager 130 to the Server Manager 152. Once the space has been allocated, the Server stores time-shifted content retrieved from the TSIP 170. In the case of time-shifted content of variable duration (e.g., a sporting event or live coverage of some other event having an unknown duration), a first portion of memory is allocated. As the allocated memory is "consumed" by the storage of the variable length time shifted content, additional portions of memory are allocated such that all of the variable length time-shifted content may be stored. For example, in one embodiment of the invention, memory sufficient to store the streams associated with two hours of content is initially allocated. Upon the utilization of the predetermined amount of the allocated memory (e.g., one half or three quarters), memory sufficient to store an additional hour's worth of content is allocated. This process is repeated as necessary until reception of the variable length time-shifted content has terminated. After the termination of content storage, any remaining memory that has been allocated but not utilized to store content is de-allocated, such that additional content may be stored. This process is controlled by the DIVA video server 150 with, optionally, assistance from the time-shift scheduler 110.

In the exemplary embodiment, a Head End in the Sky (HITS) 105 provides a plurality of variable bit rate data streams comprising encoded or compressed audiovisual information (i.e., content) and, optionally, auxiliary information associated with the content streams. A decoder 106 operates to decode the plurality of content streams to produce a corresponding plurality of baseband content streams, which are coupled to a multiple system operator (MSO) such as a cable television provider (not shown) and to the functional element denoted as the Time Shift Introduction Process (TSIP) 170. Thus, the exemplary embodiment finds particular applicability within the context of an MSO utilizing the DIVA IOD system and, more particularly, an MSO providing the Time Shift TV (TSTV) using this IOD system. In such a system, each STT receives normal broadcast content (non-time-shifted content) via the normal MSO distribution channel (not shown) and time-shifted or on-demand content via the network equipment 160.

Time-Shifted Content Introduction and Storage

Generally speaking, time shifted content comprises sufficient information to convey a program to a viewer at time different than its original broadcast time, and with the ability to interactively modify the presentation by, for example, skipping or streaming forward or backward in presentation time. In one embodiment, time-shifted content includes real time encoded play tracks, fast-forward tracks, and rewind tracks, as well as the Entry Point Data (EPD) files associated with each track. In one embodiment, each track is multiplexed at a transport rate of 3.6 Mbs for PAL content or 3.37 Mbs for NTSC. The play tracks include Dolby audio encoded at 192 Kbps. The fast forward and rewind tracks will not contain audio and will have a slightly higher video-encoding rate.

In the exemplary embodiment, the Time Shift Introduction Process (TSIP) function 170 is implemented using an Encoder Switch (i.e., a video switch) 171, a plurality of encoders denoted as encoders $172_1$, $172_2$ and so on up to $172_M$ (collectively encoders 172), a Time Shift Post Processor (TSPP) 173, buffer memory 174, a Time Shift Controller (TSC) 175 and, optionally, an Advertisment Detection and Indexer (Dexter) 176.

Generally speaking, a "tome" comprises all the files and metadata required to represent a program within a server. In the system 100 of FIG. 1, a "tome" comprises an Entry Point Data File, the Tome Description File (TDF), a Metadata File (MDF), any JPEG files, the preview, play, fast forward and rewind tracks and other data needed for the distribution of a title to users. The Tome Description File comprises an .XML file, which itemizes the files that compose the tome. It includes the size, ID type, bit rate and latest modification date of each file, as well as other content related information as described in the Content Format Specification (69-0137). A Metadata File comprises an .XML script which contains all of the Title, Rights and Schedule information necessary to completely define and schedule a given piece of content.

The Time Shift Scheduler (TSS) 110 is used by program planners (e.g., the MSO programmers) to generate a Title Plan in order to schedule the acquisition (i.e., "capture") of broadcast content. Information about which broadcast programs are to be captured for time shifting are provided to the Interactive Programming Guide (IPG) system 120 as a Capture Plan. The TSS 110 also generates an Acquisition Plan with the same information for use by the Time Shift Introduction Process (TSIP) function 170 to schedule the encoding of broadcast programs.

In one embodiment, the title plan is generated according to subscriber input. For example, where a plurality of subscribers select desired content channels, those channels(s) and/or individual titles or programs receiving the most "votes" are preferably recorded for subsequent presentation.

The Time Shift Controller (TSC) Function 175 receives the content acquisition schedule from the time shift scheduler 110 and responsively controls the Encoder Switch 171 and Time Shift Post Process functions 173. The Time Shift Controller (TSC) function 175 controls the video switch Encoder Switch 171 based on the schedule of programs to be encoded provided by the Acquisition Plan. The TSC also monitors the status of the Time Shift Post Process (TSPP) function. Prior to activating an encoder, the TSC provides a Tome Ready Notification to the CM.

The encoders 172 are initialized, controlled, and monitored by the Time Shift Controller (TSC) function 175. Encoder control includes commands for starting and stopping an Encoder and establishing encoding parameters (e.g., bitrate, image size, format and the like). Encoder selection is controlled by TSC via the Encoder Switch, based on the Acquisition Plan indicating the channel(s) and time(s) of time shifted content to be captured, and the availability of Encoders.

Each Encoder writes the encoded content into buffer memory 174. The Time Shift Post Process (TSPP) function 173 reads the content from the buffer memory 174, generates Entry Point Data (EPD) files for each of the 3 encoded video streams, and writes those files to memory buffers accessible by the Server.

The Encoder Switch 171 is utilized to eliminate the need to dedicate an encoder for each input channel. The Encoder Switch 171 couples any of the, illustratively, N content streams provided by the Decoder 106 to any of the encoders 172. Where only a subset of the available content streams are to be time-shifted, the TSC 175 causes the encoder switch to couple only the appropriate subset of baseband content streams to respective encoders 172. In one embodiment, the encoder switch accepts audio and video streams from multiple broadcast channels and allocates the streams to encoders based on encoder availability. In this manner, the need to dedicate an encoder for each channel is eliminated.

The encoders 172 selected by the encoder switch 170 receive input from broadcast receivers in, illustratively, a decoded baseband audiovisual format and encode the audio and video information according to the MPEG-2 standard to provide, at respective outputs, MPEG-2 transport streams suitable for use as play, fast forward and rewind streams. The use of such "play," "FF" and "RW" in response to user requests for corresponding "play," "FF" and "RW" functions provides the VCR-like user manipulations.

In an exemplary embodiment of the Invention, each of the encoders 172 comprises a so-called "all-in-one" that described in more detail in U.S. Pat. No. 6,389,218, issued May 14, 2002, which is incorporated herein by reference in its entirety. Briefly, the "all-in-one" encoder simultaneously produces MPEG-2 compliant fast forward, fast reverse and normal play bitstreams from a sequence of video frames such as provided by an IEC 601-format digital video baseband stream. The encoder subsamples the video sequence, extracting a plurality of frames from the video sequence and buffering the subsampled frames. Simultaneous with the subsampling and buffering, the source frames are encoded within a real-time encoder, e.g., an MPEG-2 encoder. The buffered frames are recalled from the buffer and coupled to a second real-time encoder. The second encoder forms both the fast forward and fast reverse bitstreams using a time multiplexing technique wherein a group of pictures (GOP) for the fast forward stream can be formed, followed by the compression of the same GOP having the frames organized in reverse order. As such, the compressed GOPs are represented by the fast forward and fast reverse bitstreams. The play, fast forward, and fast reverse bitstreams for each GOP are organized into a file and stored on the mass storage device (e.g., disk drive array) of a file server.

In one embodiment, the Time Shift Post Process (TSPP) 173 receives the MPEG-2 transport streams from the Encoders 172. The TSPP inserts Title Identification Codes (TICs) to enable the streams to be identified. The TIC insertion comprises, illustratively, adding a 4 byte TIC header to each 188-byte MPEG packet, resulting in 192-byte server packets. In addition, the TSPP generates Entry Point Data (EPD) files for each of the Play (.NOR), Fast Forward (.FF) and Rewind (.RW) streams or "tracks." The EPD files allow the server 150 to transition between the Play, FF and RW streams at appropriate points in response to user commands.

TABLE 1

| | | | | | |
|---|---|---|---|---|---|
| T Time Shifted Content (5 bits) | Year 00-31 (5 bits) | Month 1-12 (4 bits) | Day 1-31 (5 bits) | 64 Unique ID values (6 bits) | 26 Absolute Channels A-Z (5 bits) |

Referring now to Table 1, a unique Title Identification Code (TIC) is assigned to each program. The first and last 5-bit fields consist of upper case letters. The central 20 bits provide a date stamp and unique identification value for each program. The 1st TIC character is a "T" to indicate time-shifted content. The last 5 bits indicate 26 "absolute" channels. The TSS maps local (relative) channels to these absolute channels in order to maintain a standard Interface with the TSC. The central 20 bits provide a date (modulo 32 years) with 64 program IDs per channel per day.

Although EPD files are generated as the fast forward and rewind tracks are being generated, in one embodiment the EPD data structure for the rewind track is not built for the rewind track until the entire rewind track is generated. This is because the EPD data structure is defined as a fat wide tree. The fat tree must be built in order starting from the beginning of the EPD. However, since the beginning of the rewind track and therefore its associated EPD is not available until the entire rewind track is captured, the EPD won't be available on the server until then. During the capture period, the generated rewind EPD is buffered.

The streams processed by the TSPP 173 are coupled to the memory buffers 174 for temporary storage prior to introducing (i.e., loading) the streams onto the server 150. The time-shifted content streams provided by the buffer 174 are coupled to the server 150 via, illustratively, an Ethernet connection.

In one embodiment, each encoder receiving baseband content produces corresponding play, FF and RW tracks. Each track comprises a plurality of extents, each extent representing a respective portion of the underlying play, FF or RW track. The play and FF track extents are loaded onto the server in a front to back order (i.e., the first extent is located in the position of the first extent to be streamed, the next extent is located in the position of the next extent to be streamed and so on up to the last extent, which is located in the position of the last extent to be streamed). By contrast, the RW track extents are loaded in a back to front order (i.e., the first extent is located in the position of the last extent to be streamed, the next extent is located in the position of the next to last extent to be streamed and so on up to the last extent, which is located in the position of the first extent to be streamed). In this manner, the FF and RW tracks may be simultaneously loaded using the same extents.

When the server 150 is ready to be provisioned, the TSC 175 causes the buffers 174 to provide the buffered streams to the server 150. The server 150 receives the streams and passes the streams to a plurality of loop server modules (LSMs) 156.

Each LSM 156 comprises, illustratively, a plurality of storage elements arranged in a network loop configuration (e.g., a plurality of disk drive arrays communicating via a loop architecture). It will be appreciated that while the inventors utilized the loop configuration, any server configuration may be adapted for the storage of the time shifted content. Moreover, a single server module may be used instead of a plurality of server modules.

Once stored on the Server 150, the content is available to the subscribers or users as either the DIVA TV service mode or the Capture TV service mode. The user accesses the stored time shift content through one of three methods: through remote control keys such as rewind and pause, through an IPG, or though the DIVA Navigator.

Time shifted content Navigator List index information is provided to the CM for use by the Navigator Application Server (NAS). These list index values, along with screen names, are used by the STTs when initiating time shifted services from a Navigator screen.

DIVA TV and Capture TV Operating Modes

A time-shift television system according to an embodiment of the invention provides two modes of operation; namely, DIVA TV and Capture TV. In the DIVA TV mode of operation, programs from a particular channel are captured and stored up to a fixed "window" of time. That is, the DIVA TV operating mode makes available the content provided during the previous "x" hours via that channel. In the Capture TV mode of operation, selected programs from many different channels are captured and stored for subsequent viewing. The selected programs are offered to subscribers via the IPG or via Navigator menus under headings such as "title," "genre," and other criteria useful in making such a selection.

The DIVA TV window is implemented through the use of advanced Video Sequences that "string together" programs that have been captured into individual files. A play list implementation includes support for fast forward, rewind and dynamic list updating. The Navigator includes in-session navigator list updates and dynamic Video Sequence processing.

The Navigator Application Server (NAS) is responsible for establishing and maintaining Set top terminal (STT) video sessions. The NAS is also responsible for sending stream control commands to the Server based on requests coming from the Set top terminal. The NAS supports Set top terminal navigation and title selection when the Set top terminal is using, for example, the DIVA Navigator. The NAS will also support title selection initiated from time shift IPG screens.

The NAS communicates to the Set top terminal through Out of Band (OOB) control channel. During session establishment, the NAS allocates in band resources that define the video path between the Server and the Set top terminal. Those resources are used for all pointcast transmissions between the Server and the Set top terminal.

The NAS receives time shift availability information from the CM in the form of Navigator (NAV) lists and Video Sequence updates. The NAS uses this information to support navigation, title selection, and Video Sequence processing.

There are three major methods of initiating of time-shifted services from the Set top terminal: (1) pressing pause or rewind from broadcast mode; (2) selecting a title from a time shift IPG screen; and (3) selecting a time shift title from a DIVA Navigator screen.

When a viewer presses rewind while watching a time shift capable channel, the STT sends the NAS a message indicating which channel is being viewed and what button was pressed. The NAS uses the navigation lists sent by the CM to determine what title should be streamed to the viewer, send the appropriate server commands, and send a decode message to the STT.

When a viewer presses pause while watching a time shift capable channel, the STT sends the NAS a message indicating which channel is being viewed and what button was pressed. The NAS determines which title the viewer is interested in, using the list information provided by the CM, and sends a command to the Server to start a stream for that title in pause mode from the last written extent. When the viewer presses a button to start viewing the time-shifted title, the NAS sends a server command to start streaming the title from the file position where it was paused and send a decode message to the STT.

When a viewer selects a time-shifted title from a time shift IPG screen, the STT sends the NAS a message containing the screen name and the list index of the selected title. The NAS uses the list information provided by the CM to determine which title the viewer has selected. The NAS then sends a server command to start streaming the title and send a decode message to the STT.

When a viewer selects a time-shifted title from a DIVA Navigator list screen, the STT sends the NAS a message containing the list index of the selected title. The NAS uses the list information provided by the CM to determine which title the viewer has selected. The NAS then sends a server command to start streaming the title and send a decode message to the STT.

The NAS optionally provides list play capabilities. List play processing is described in more detail in U.S. patent application Ser. No. 09/458,319 which was filed on Dec. 10, 1999 and is incorporated herein by reference in its entirety. Briefly, a plurality of content streams defined by a playlist are sequentially provided to a subscriber in a substantially seamless manner and wherein the playlist is updated and otherwise maintained in response to subscriber commands and requests. A plurality of user requests for content are structured as a concatenated series of video clips or other content, such that user navigation of the concatenated content is enabled. The play list operates to synchronize, to the extent possible, the streaming or providing of various content streams to a customer within an interactive information distribution system such that transitions between provided content streams are anticipated and smoothly executed.

Video Sequences supporting the DIVA TV window concept are primarily implemented in the NAS, and are supported by a queued commanding capability. If there is a Video Sequence associated with a title selection, after initiating a stream for a viewer and after major stream changes like direction or completion, the NAS sends a queued command to the server indicating the next title to stream after the current title completes.

The IPG 120 may be implemented using a server-based IPG system, such as described in U.S. patent application Ser. No. 09/293,526. The IPG may also be implemented using a client-based IPG system. However, the client-based IPG system typically utilizes a client-side database that requires updating to indicate timeshifted content.

In order to support initiation of time-shifted services from the server-based IPG, the STTs include capabilities such as the ability to tune digital channels containing the IPG streams and the ability to process bitmaps and control data associated with those streams. The IPG System broadcasts time shift specific screens showing the viewer what programs are available for viewing. A supplemental IPG data stream contains time shift screen information that will enable the Set top terminal to tell the Navigator Application Server (NAS) which program the viewer has selected. An exemplary STT will be described in more detail below with respect to FIG. 2.

When the set top initiates time-shifted services using the rewind and pause buttons, the Set top terminal sends a message to the NAS indicating which channel the Set top terminal is tuned to and which button was pressed. In the case of the rewind button, the NAS commands the Server to stream rewind track for that service starting at the most recently written content for that title. In the case of the pause button, the NAS waits until the viewer presses a button to leave pause then the NAS commands the Server to stream the title from the paused position.

When a DIVA TV stream is first initiated, and any time there is a user initiated stream change, the STT displays a new VCR On-Screen Display (OSD). Play, fast forward and rewind icons are displayed. The STT and NAS support the desired action based on the user selection of these icons. The VCR OSD remains on the screen for a few seconds and is then removed. The VCR OSD is typically not used for Capture TV titles.

Once a time-shifted title has been selected, VCR control over the title is similar to VOD control with a few additions. The two major differences are stream termination processing and DIVA TV title boundary processing.

In general, when a viewer is done watching a DIVA TV title, the viewer returns to the broadcast channel associated with that DIVA TV title. The NAS will use a new forced tuning command to tell the STT which channel to tune to. When the viewer is done watching a Capture TV title, the viewer is returned to the DIVA Navigator.

If the viewer is watching a DIVA TV title and one of that titles boundaries has been reached in NOR, FF, or RW mode, the viewer continues in that same mode into the next (or previous) title in the Video Sequence. When the forward Video Sequence boundary has been reached, the viewer is returned to broadcast mode. When the reverse play list boundary is reached the NAS sends a forced pause message to the STT. The STT displays a pause splash screen. After, for example, 5 minutes, the NAS sends a forced tune message to the STT to return it to broadcast mode.

Figure 2:
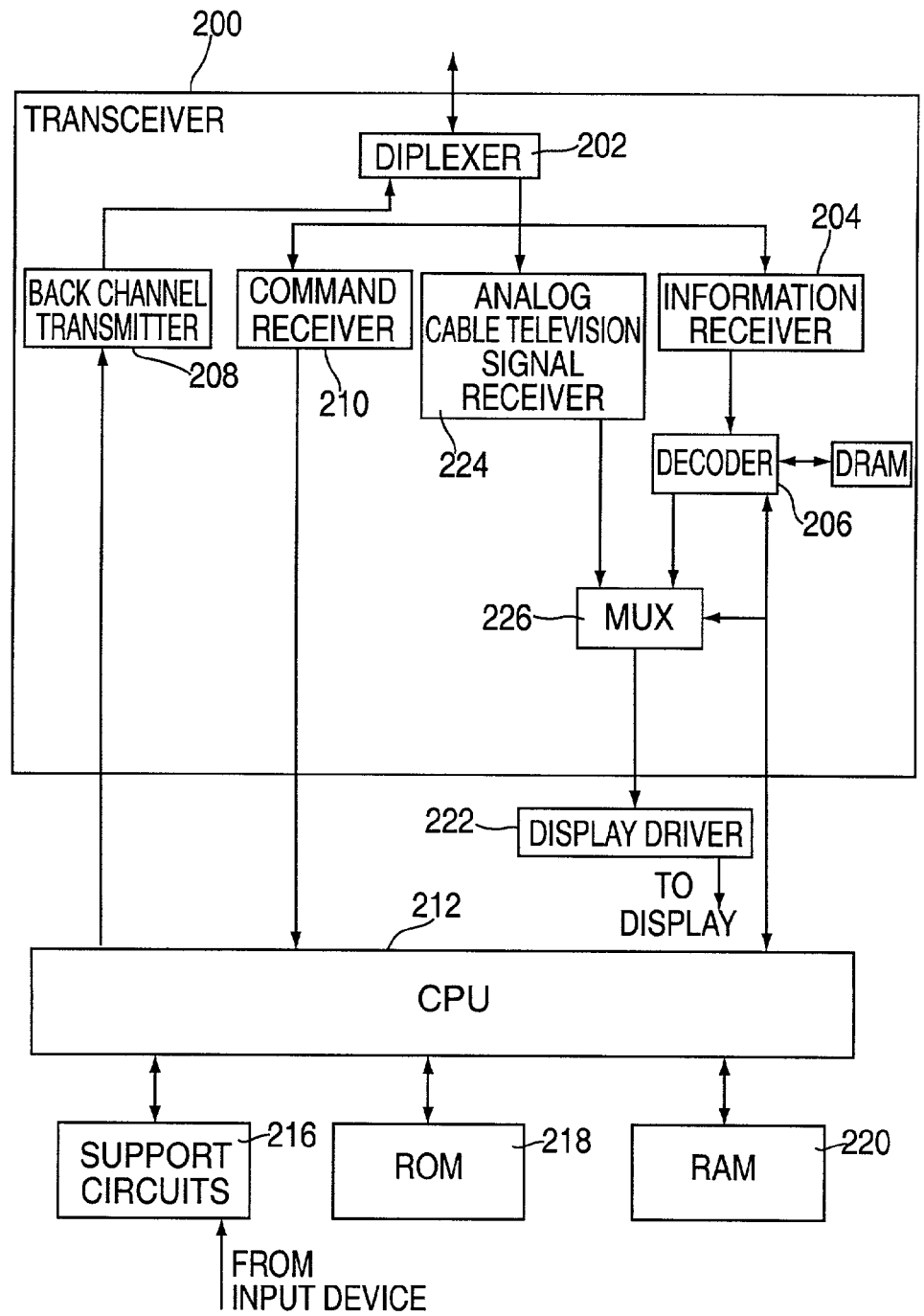
FIG. 2 depicts a block diagram of an illustrative subscriber's terminal within the system of FIG. 1.

FIG. 2 depicts a block diagram of an STT 180 which contains a transceiver 200, a central processing unit (CPU) 212 and a display driver 222. The functionality of the terminal 180 can be embedded within a single consumer electronics product such as a receiver circuit within a television. As such, the description of a separate terminal should be considered illustrative of the type of subscriber equipment that may be used to implement the present invention.

Within the set top terminal 180, the CPU 212 is supported by random access memory (RAM) 220, read only memory (ROM) 218 and various support circuits 216 such as clocks, power supply, and infrared receiver and the like. The transceiver 200 contains a diplexer 202, a back channel transmitter 208, an information channel receiver 204, a command channel receiver 210, an information decoder 206, a conventional television signal receiver 224, and a multiplexer 226. The diplexer 202 couples three channels carried by a single cable within the network to the transmitter and receivers of the terminal. Each receiver 204 and 210 contains a tuner, amplifiers, filters, a demodulator and a depacketizer. As such, the receivers tune, downconvert, and depacketize the signals from the cable network in a conventional manner. The information channel receiver 204 contains a conventional QAM demodulator, though other demodulation techniques may be used.

The decoder 206 processes the data packets carrying consumer/subscriber requested information produced by the QAM demodulator into useable signals for the end user display, e.g., television, home studio, video recorder and the like. The decoder 206 is coupled to a dynamic random access memory (DRAM) to facilitate decoding of the data packets and processing of command programs, as shall be discussed below. The signals for display are conventionally processed by a display driver 222 to produce composite video as well as conventional television signals, e.g., modulated onto channel 3 or 4 using the NTSC standard modulation.

The conventional cable signal receiver 224 contains a tuner and an analog (NTSC) demodulator. A multiplexer 226 couples the demodulated analog or decoded video signal to the display driver 222. Of course, the NTSC demodulator can be replaced with a PAL or SECAM standard demodulator, as needed.

The demodulated QPSK signal provides command and control information to the CPU 212 for generating certain graphics and control information regions upon a television screen. This CPU, operating in combination with the decoder 206 as well as a continuously available video signal from the information channel, produces screen-displayed buttons, icons and graphical regions with which a consumer interacts using the remote control.

In a Navigation context, a joy stick or other input device on a remote control (not shown) selectively highlights certain predefined regions on the television screen. To perform such highlighting, a reference region is always highlighted when a menu is first displayed. From that reference region, direction vectors produced by the joy stick are interpreted by the CPU 212 to highlight a region lying in the direction in which the joy stick was moved. When a desired selectable icon is highlighted, the consumer depresses a "select" key on the remote that sends an infrared signal to an infrared receiver (a support circuit 216). This receiver sends the select command to the CPU 212 for interpretation. The selected region is generally associated with a function. If the function is a request for specific information or requires a change in the menu, the CPU 212 formats the command and sends it through the back channel transmitter 208 for transmission to the NAS 140. If the command is a function that is handled locally such as volume control, the CPU 212 implements the function within the terminal 180.

In the Navigation context, each command menu is implemented by executing an "applet", as described below. The applets control both information sessions, e.g., the presentation of video to the television screen, and navigator functions, e.g., the menus that facilitate selection of a video program as well as subscriber on demand services. As such, particular commands include, but are not limited to, information or menu navigation commands, movies start at beginning, movies start at the middle, play, stop, rewind, forward, pause and the like. These presentation and navigation control commands are sent via a back channel transmitter 208 using binary phase shift key (BPSK) modulation. Additionally, the CPU in the subscriber terminal implements certain local commands such as increment or decrement the volume, channel change and on/off. The IPG processing is handled according to the IPG requirements.

Figure 3:
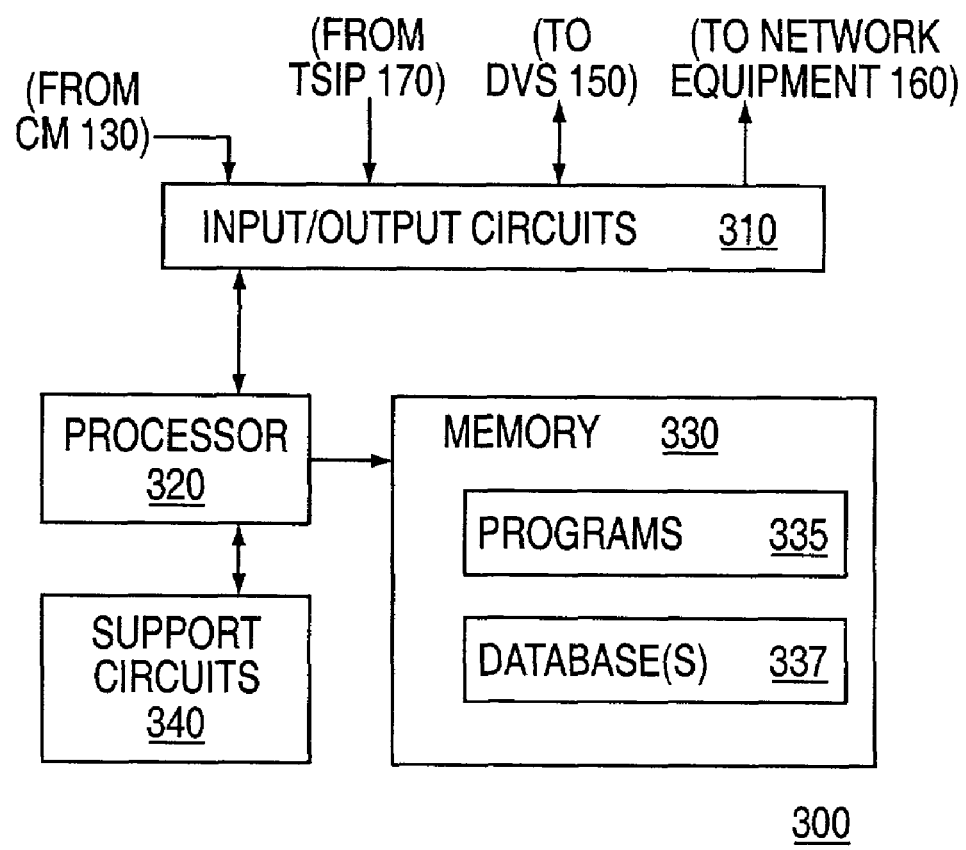
FIG. 3 depicts a high level block diagram of control circuitry suitable for implementing various functions within the time-shift television system of FIG. 1.

FIG. 3 depicts a high level block diagram of control circuitry suitable for implementing various functions within the time-shift television system of FIG. 1. Specifically, the controller 300 of FIG. 3 is depicted as implementing the navigation application server 140 within the TSTV system 100 of FIG. 1. However, the basic circuitry described with respect to FIG. 3 may be used to implement additional functional elements described above with respect to FIG. 1. Moreover, the circuitry of FIG. 3 may be replicated such that each functional element within the TSTV system 100 of FIG. 1 is implemented using a similar controller arrangement. Therefore, while the below description primarily addresses the NAS 140, it must be appreciated that the various functions described within the TSTV system 100 of FIG. 1 may be similarly implemented using appropriate programming commands and storage systems.

The controller 300 of FIG. 3 comprises a processor 320 as well as memory 330 for storing various programs 335 and data 337. The processor 320 cooperates with conventional support circuitry 340 such as power supplies, clock circuits, cache memory and the like, as well as circuits that assist in executing the software routine stored in the memory 330. As such, it is contemplated that some of the process steps discussed herein as software processes may be implemented within hardware, for example, as circuitry that cooperates with the processor 320 to perform various steps. The controller 300 also contains input/output (I/O) circuitry 310 that forms an interface between the various functional elements cooperating with the controller 300 required to implement the function to which the controller 300 is applied. For example, in the case of the controller 300 implementing the NAS function 140 described above with respect to FIG. 1, the I/O circuitry 310 cooperates with the content manager 130, the time-shift introduction process 170, the video server 150 and the network equipment 160. Where the controller 300 is used to implement a different functional element, the I/O circuitry 310 will cooperate with cooperate with the different functional elements. Moreover, in this case the programs 335 will implement a different function, and a data base 337 will store different data.

Although the controller 300 of FIG. 3 is depicted as a general purpose computer that is programmed to perform various functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

Figure 4:
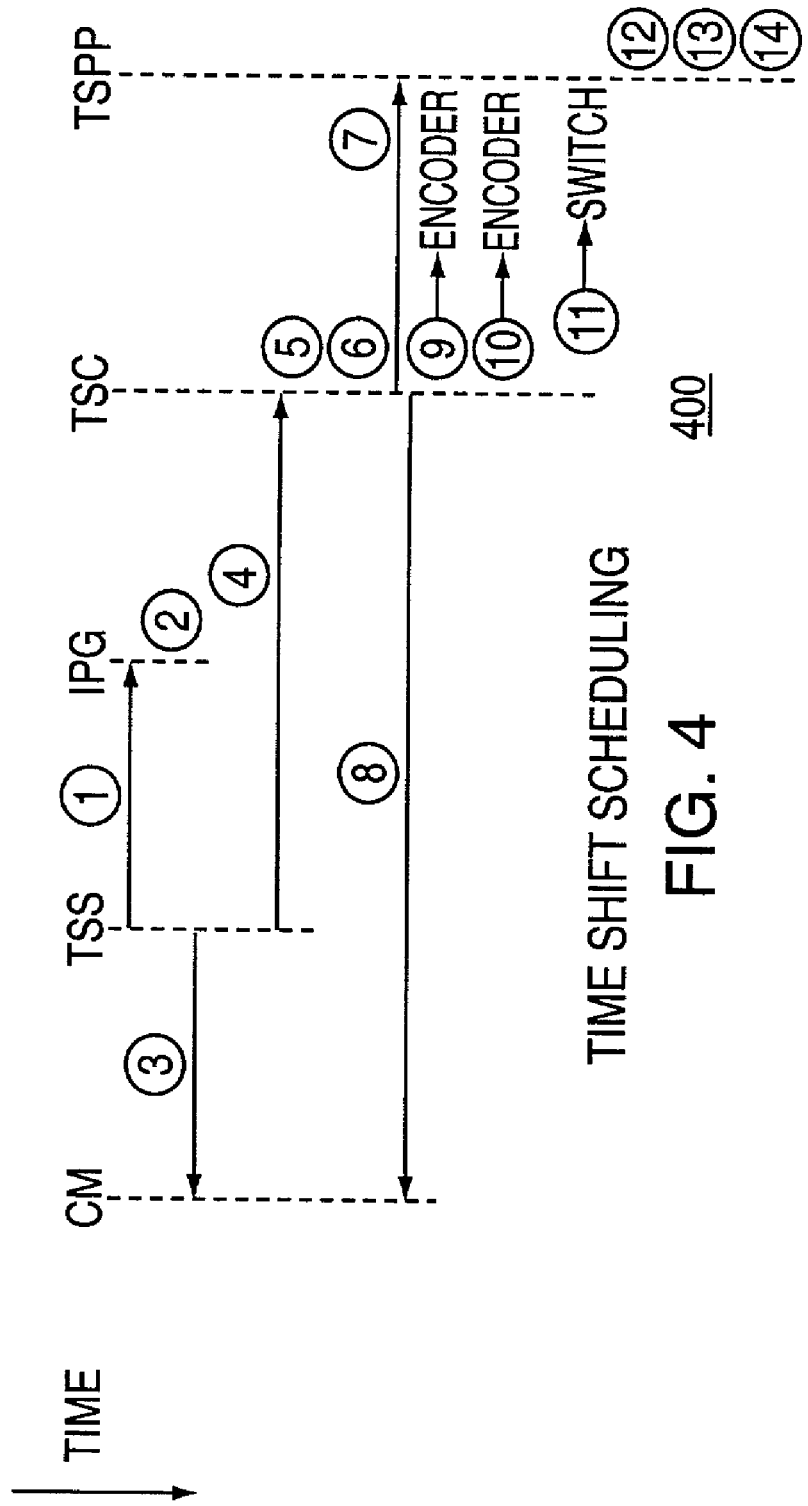
FIGS. 4-10 depict flow diagrams of various methods supported by the present invention.
Figure 5:
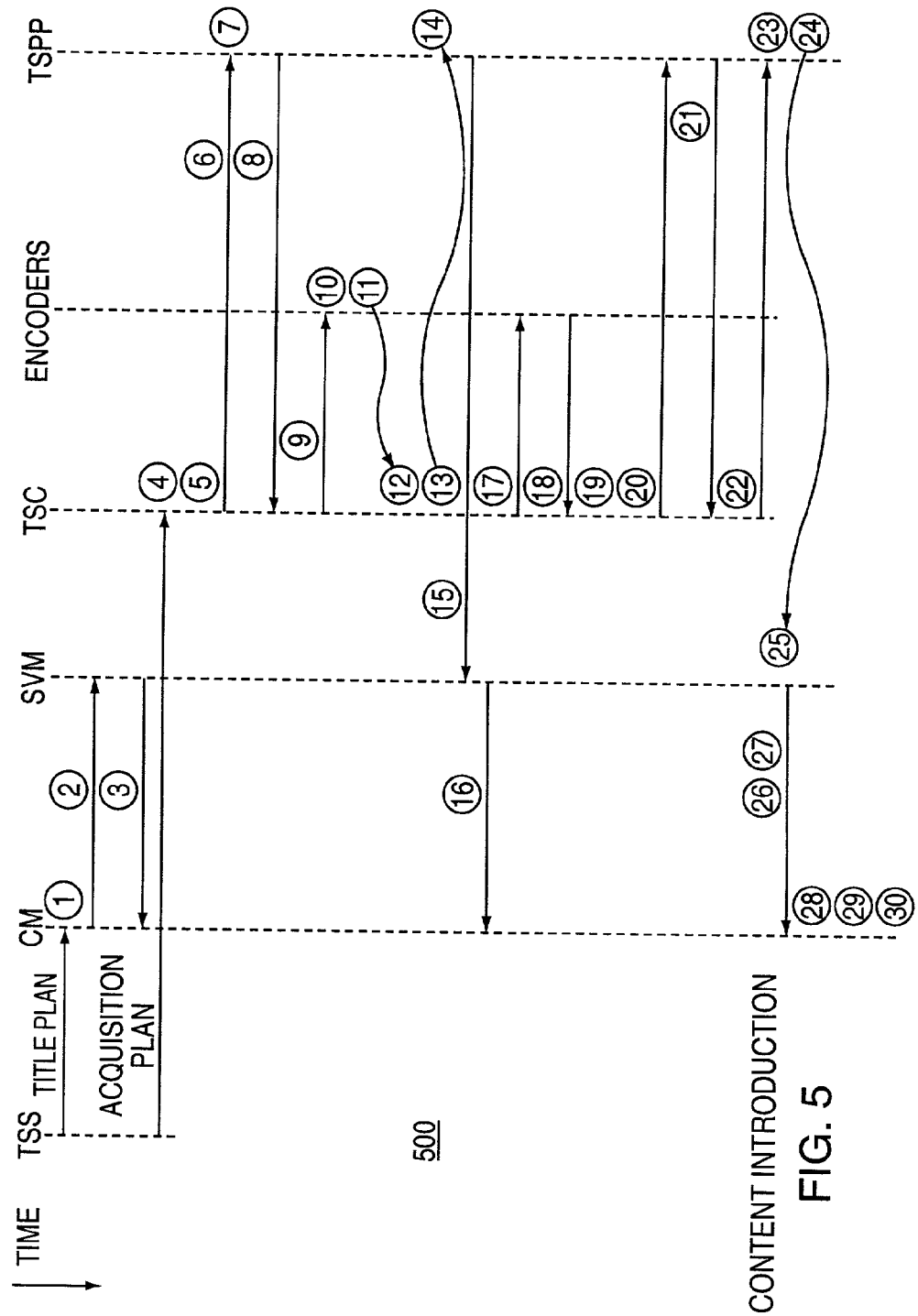
Figure 6:
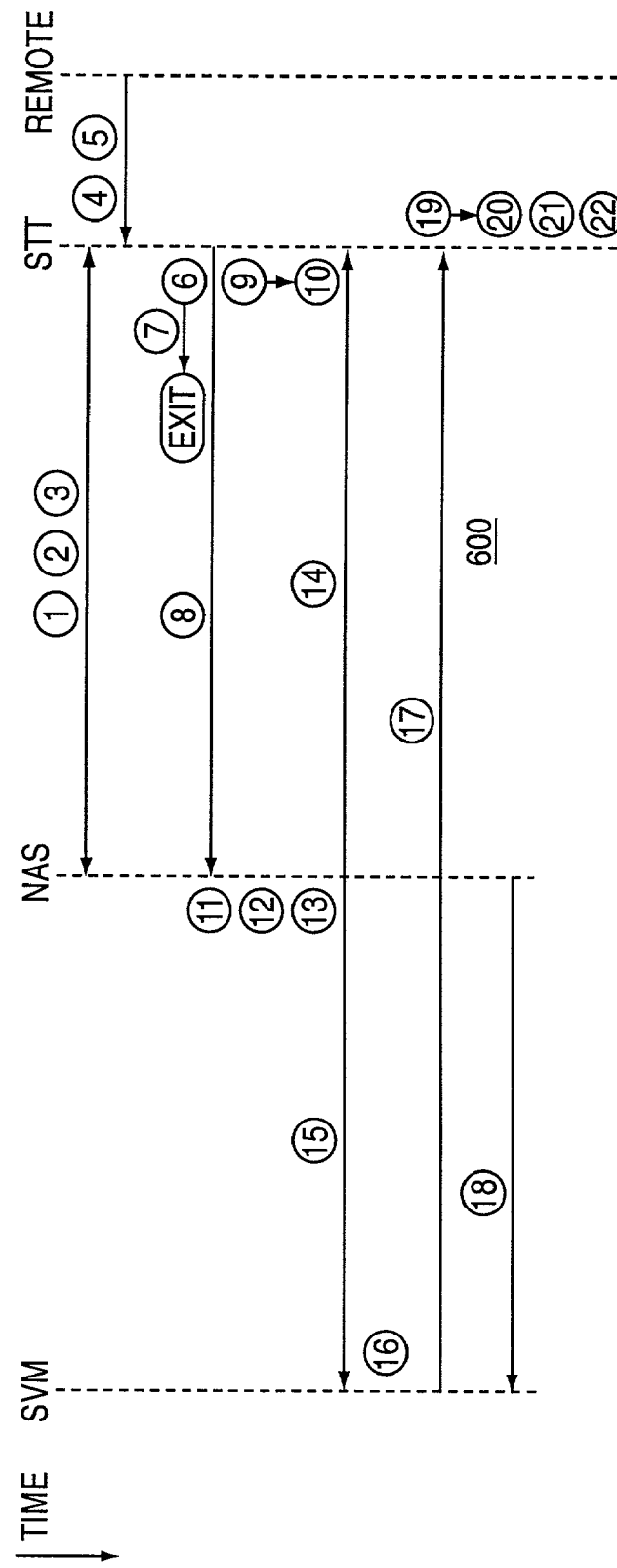
Figure 7:
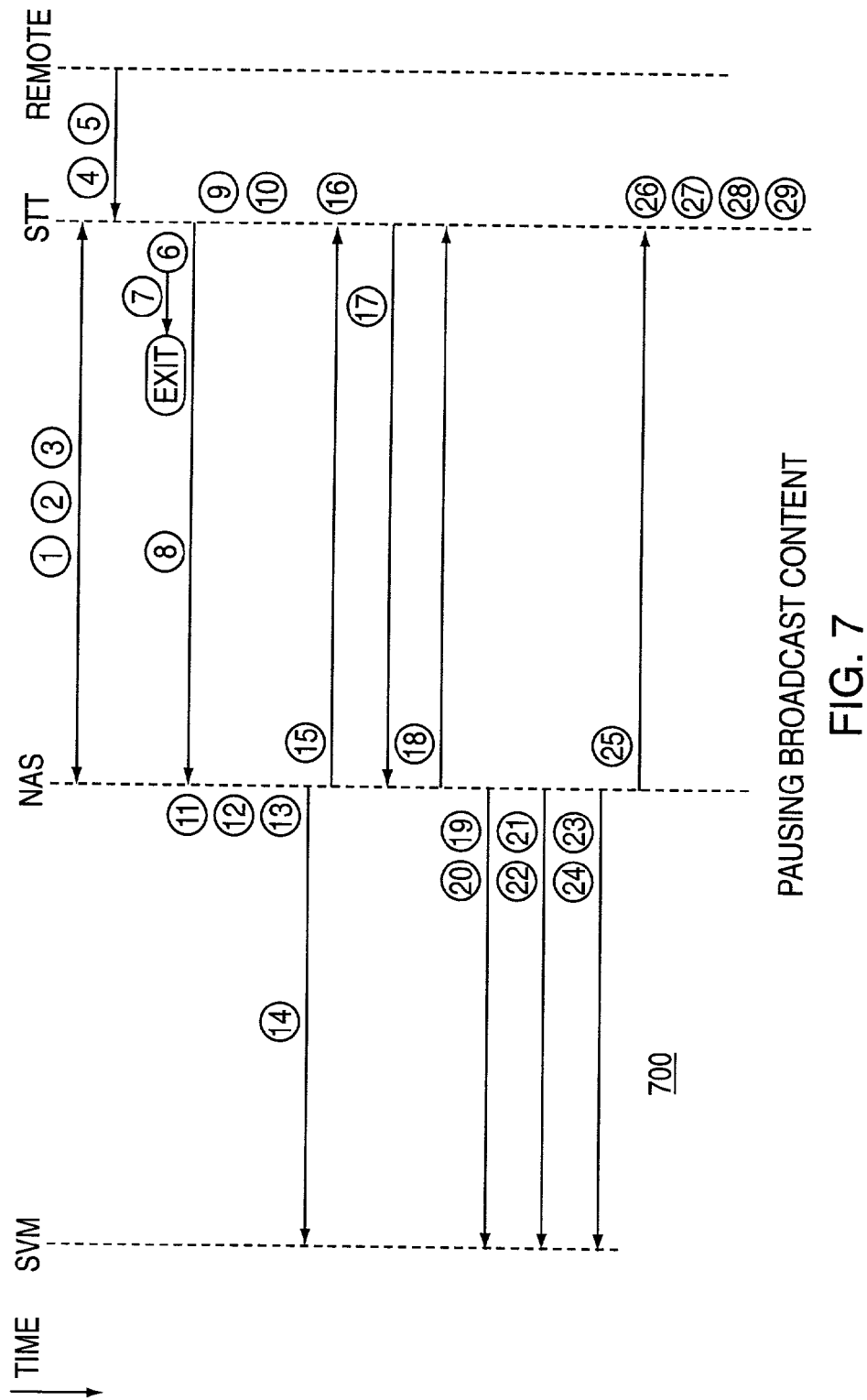
Figure 8:
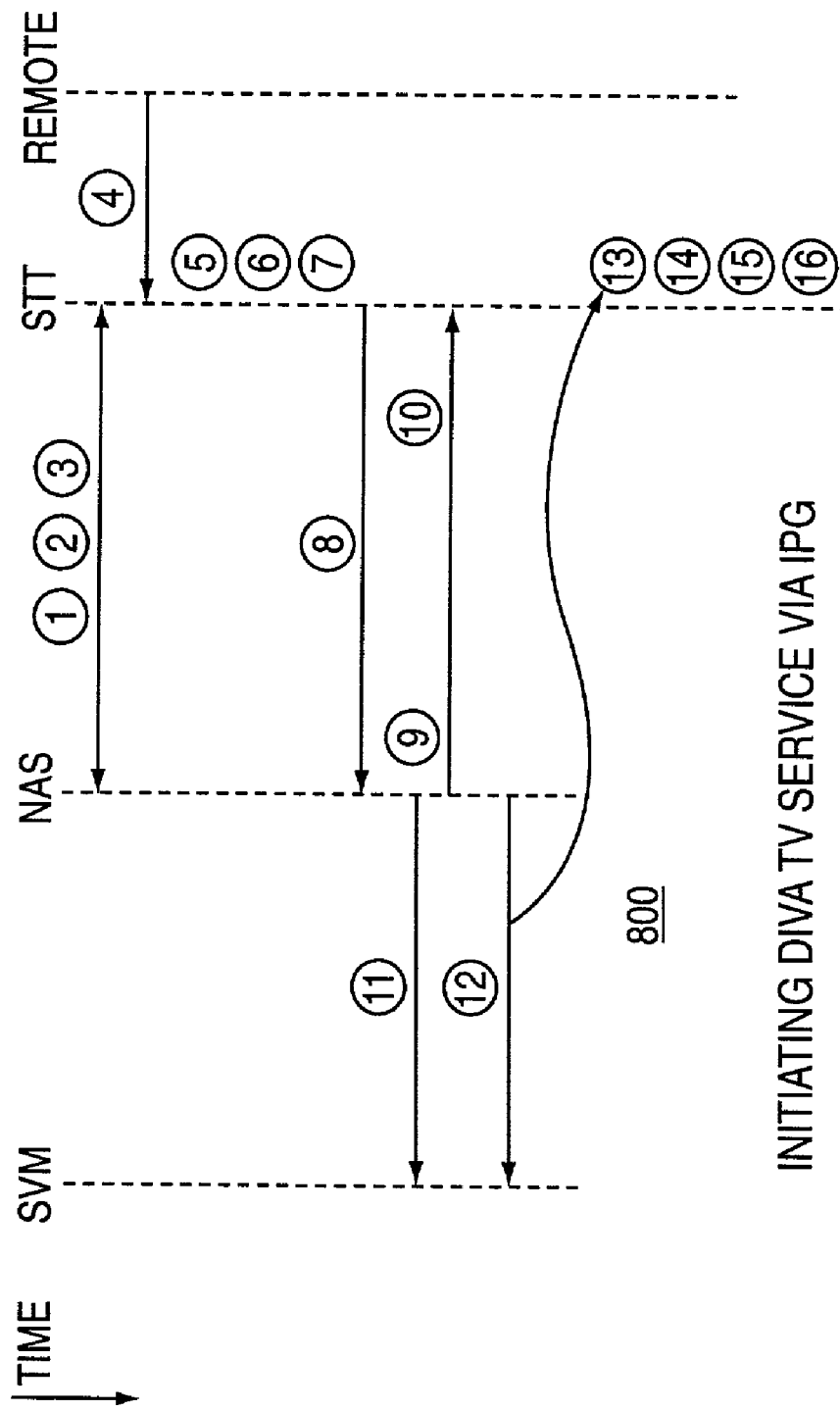
Figure 9:
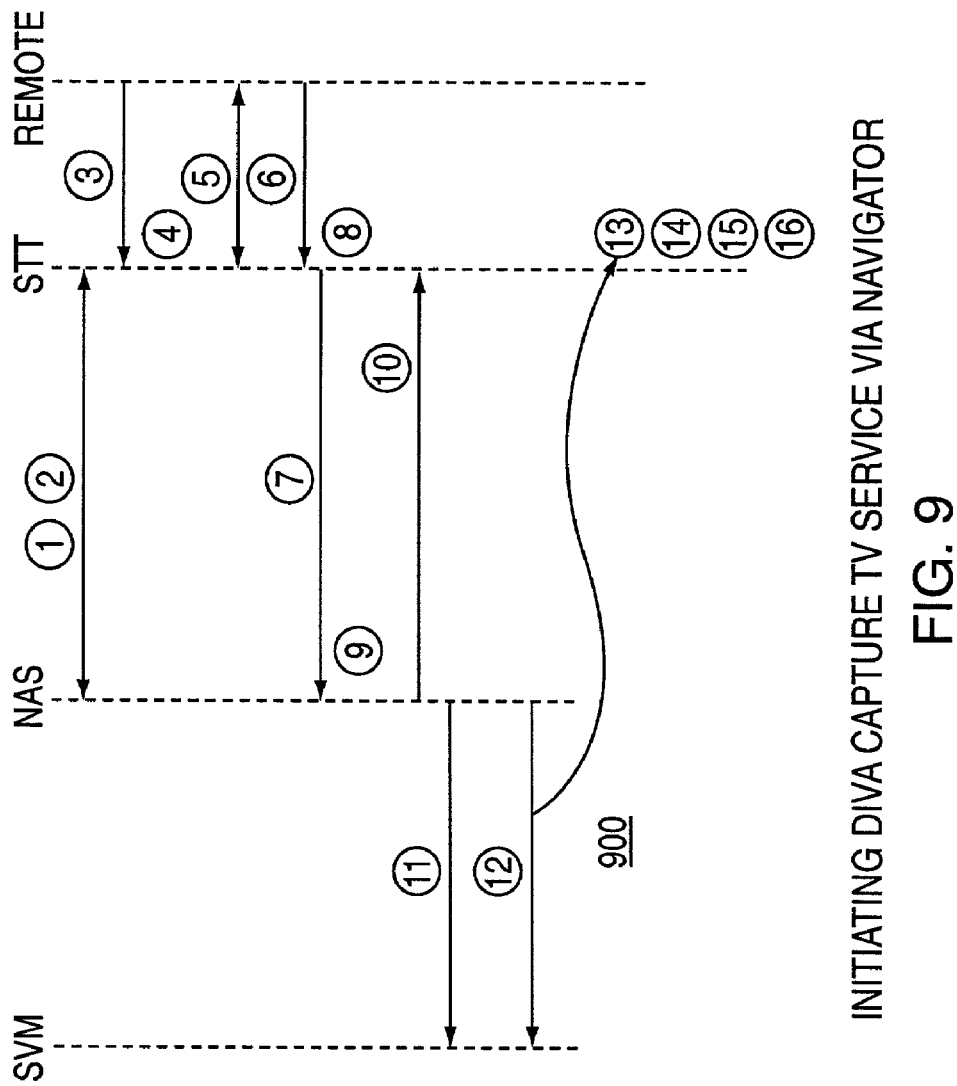
Figure 10:
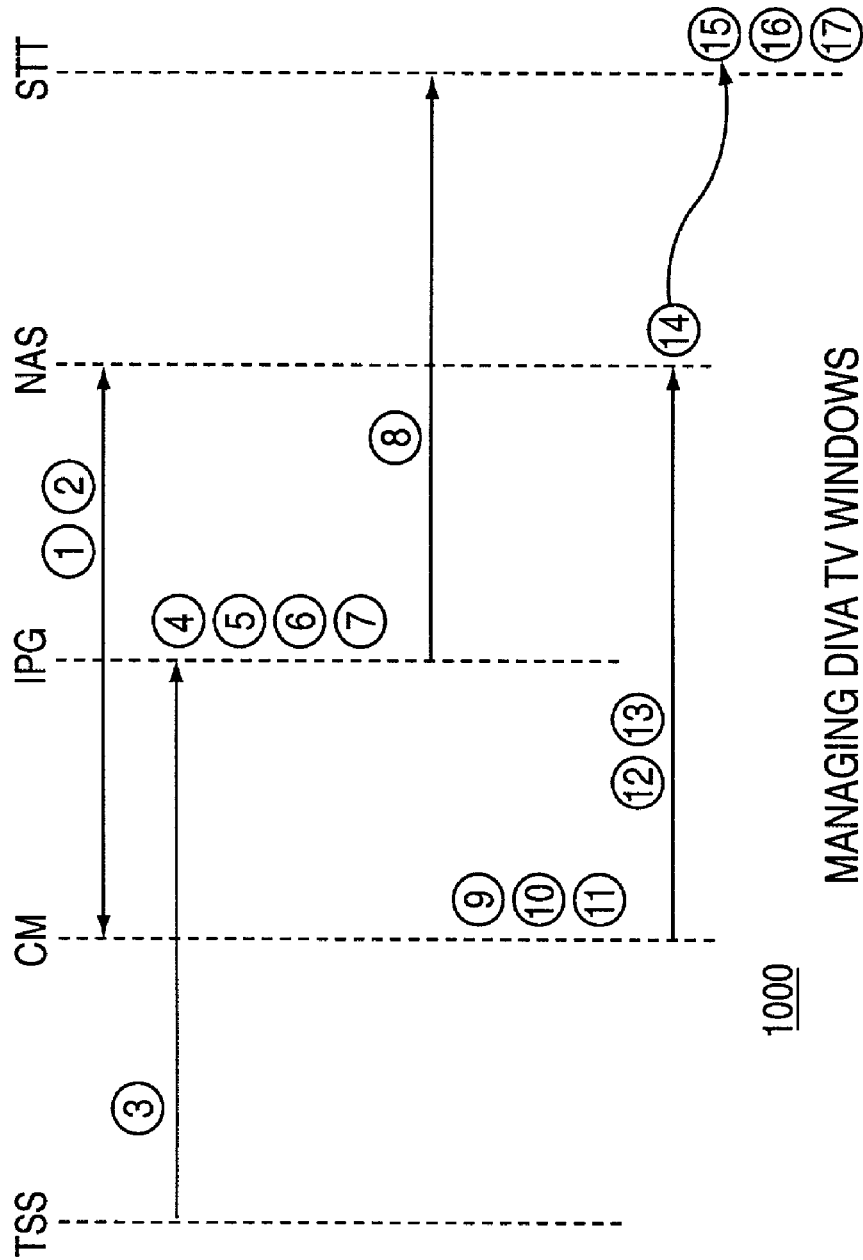

FIGS. 4-10 depict flow diagrams of various methods supported by the present invention. Specifically, FIG. 4 depicts a method for scheduling time-shifted content, FIG. 5 depicts a method for introducing content to a server, FIG. 6 depicts a method for rewinding broadcast content in response to rewind command, FIG. 7 depicts a method for pausing broadcast content in response to a pause command, FIG. 8 depicts a method for initiating DIVA TV service in response to an IPG-related command, FIG. 9 depicts a method for initiating Capture TV service in response to a Navigator-related command, and FIG. 10 depicts a method for managing DIVA TV windows.

Referring now to FIG. 4, the following steps describe the process of scheduling time shifted content according to one embodiment of the invention:

(1) The TSS sends the IPG the list of programs to be time shifted. (2) Then the IPG adds the time shifted property to the appropriate programs and sends the IPG Screens to the STT. (3) Then the TSS sends the CM a Title Plan containing the schedule of time shifted programs to be provided. (4) Then the TSS sends the TSC an Acquisition Plan containing the schedule of time shifted programs to be encoded. (5) Then the TSC monitors Encoder activity and directs the Encoder Switch to allocate the appropriate Encoder, and (6) monitors buffer memory and assigns necessary Memory Buffers for storage of encoded content by TSPP. (7) The TSC sends buffer location and size data to the TSPP prior to turning on the selected Encoder, (8) the TSC sends a Tome Ready Notification to the CM. (9) The TSC turns on the Encoder(s) and (10) multiplexers within the Encoders are configured to detect and mark Random Access (Entry) Points indicating program start and stop points (these Entry Points will be used for ad insertion and MPEG Splice Points). (11) If consecutive programs on the same channel are scheduled for encoding, the switch assignment to that channel is maintained and a second set of buffers is assigned by the TSC. Steps (6)-(9) are repeated for consecutive programs on the same channel. (12) Then the TSPP builds a table of program entry and exit (splice) points for use in developing Video Sequences and News On Demand (NOD). (13) Then the TSPP performs TIC insertion and generates EPD files for each of the encoded play (NOR), FF and RW streams. (14) Then the TSPP directs encoded streams to buffers allocated by TSC.

Referring now to FIG. 5, the following steps describe the process of introducing time shifted content to the server according to one embodiment of the invention:

(1) The CM reads the Title Plan to determine what new files to add. (2) The CM sends a Retrieve Title command to the SVM for each title. (3) The SVM sends an acknowledgement for each Retrieve Title command. (4) The TSC reads the Acquisition Plan file to determine when to turn Encoders on and off. (5) The TSC determines the unique TIC for each title from the Acquisition Plan. (6) The TSC sends the TSPP a Request Port command for each track of a new title. (7) The TSPP receives the Unique Id and Track Type from the request Port command. (8) The TSPP return a Port Assignment to the TSC for each port request. (9) The TSC turns Encoders on based on the Acquisition Plan. (10) The Encoders start generating MPEG transport streams for each track. (11) The Encoders write transport stream packets into buffers. (12) The TSC reads the Encoder buffers and packs the content into UDP packets. (13) The TSC writes the UDP packets to Ethernet using the port assignments received from the SVM. (14) The TSPP reads the UDP packets from the Ethernet ports into local buffers. (15) The TSPP processes content into extents. (16) The SVM sends the CM a Retrieve Title Progress message as the first extent is written for each track. (17) The TSC turns Encoders off based on the Acquisition Plan. (18) The TSC reads the last of the content from the Encoder buffers and packs it into UDP packets. (19) The TSC sends last UDP packet across Ethernet connection. (20) The TSC sends a Request Port command to indicate the end of the track and, optionally, the start of a new track. (21) The TSPP sends a Port Assignment to the TSC to confirm the end of the track. (22) The TSPP reads the last UDP packet for a track. (23) The TSPP pads the end of the content to fill the current extent. (24) The TSPP marks the extent trailer to indicate the end of the content. (25) The SVM detects the end of content indication in the extent trailer. (26) The SVM sends the CM a Retrieve Title Progress message as the last extent is written for each track. (27) The SVM sends the CM a Retrieve Title Notify message when all tracks for a title have completed. (28) The CM receives the Retrieve Title Notify message. (29) The CM updates NAS NAV lists. (30) The CM sends updated lists to the NAS.

Referring now to FIG. 6, the following steps describe the process of initiating a rewind command within the context of a broadcast mode of the above-described DIVA TV service according to one embodiment of the invention:

(1) The Session has already been established. (2) The In band resources have been assigned to the STT. (3) The Viewer tunes broadcast channel. (4) The Viewer presses a Rewind button on a remote control device linked to the viewer's STT. (5) The STT receives the rewind button indication. (6) The STT compares current channel to time shift availability information. (7) If the currently viewed channel is not a time shift channel or not in a DIVA TV window, then no action is taken (i.e., standard broadcast cannot be rewound). (8) If the currently viewed channel is a time shift channel and the time is in DIVA TV window, the STT sends a time shift service request to NAS. (9) The STT tunes to the in band transport stream. (10) The STT displays DIVA splash screen until content starts. (11) The NAS receives the time shift service request including the channel and button pressed. (12) The NAS determines the appropriate play list based on the channel number. (13) The NAS determines the current title based on the NAV list. (14) The NAS sends a Decode message to STT. (15) The NAS sends a Create Stream command to start a Server stream for the viewer. (16) The Create Stream command tells the Server to play the current title in rewind mode from the last extent written. (17) The Server starts streaming current title. (18) The NAS sends a Change Stream command to queue up the previous title in the current play list. (19) The STT starts receiving content. (20) The STT removes the splash screen and starts presenting the content. (21) The STT displays a VCR-function on screen display (OSD) over the content. (22) The STT removes VCR OSD after a predefined time period (e.g., 30 seconds).

Referring now to FIG. 7, the following steps describe the process of initiating a pause command within the context of a broadcast mode of the above-described DIVA TV service according to one embodiment of the invention:

(1) The Session has already been established. (2) The In band resources have been assigned to the STT. (3) The Viewer tunes broadcast channel. (4) The Viewer presses a Pause button on a remote control device linked to the viewer's STT. (5) The STT receives the Pause button indication. (6) The STT compares current channel to time shift availability information. (7) If the currently viewed channel is not a time shift channel or not in a DIVA TV window, then no action is taken (i.e., standard broadcast cannot be paused). (8) If the currently viewed channel is a time shift channel and the time is in DIVA TV window, the STT sends a time shift service request to NAS. (9) The STT tunes to the in band transport stream. (10) The STT displays DIVA splash screen until content starts. (11) The NAS receives the time shift service request including the channel and button pressed. (12) The NAS determines the appropriate play list based on the channel number. (13) The NAS determines the current title based on the NAV list. (14) The NAS send an information request to the Server to obtain the position of the last written extent(s) for that title. (15) If none of the Play, Rewind, Fast Forward, Stop, or Return buttons on the viewer's remote control have been pressed within a predetermined period of time (e.g., 5 minutes), the NAS sends a forced tune Message to the STT to return it to the broadcast channel. (16) The STT tunes to broadcast channel and removes the splash screen. (17) If the viewer presses the Play, Rewind, Fast Forward, Stop, or Return buttons within the predetermined time, then the STT sends a button press indication to the NAS. (18) If the NAS receives a Stop or Return indication, then the NAS sends the STT a Forced Tune message to return the STT to the broadcast channel. (19) If the NAS receives a Play indication, then the NAS sends a Create Stream message to the SVM to start the title that was being broadcast during the pause in play mode starting from the position that was obtained from the server at the time the pause button was pressed. (20) The NAS then sends the SVM a Change Stream command to queue up the next title in the play list (if any). (21) If the NAS receives a Rewind indication, then the NAS sends a Create Stream message to the SVM to start the title that was being broadcast during the pause in rewind mode starting from the position that was obtained from the server at the time the pause button was pressed. (22) The NAS then sends the SVM a Change Stream command to queue up the previous title in the play list (if any). (23) If the NAS receives a Fast Forward indication, then the NAS sends a Create Stream message to the SVM to start the title that was being broadcast during the pause in fast forward mode starting from the position that was obtained from the server at the time the pause button was pressed. (24) The NAS then sends the SVM a Change Stream command to queue up the next title in the play list (if any). (25) The NAS sends Decode message to STT. (26) The STT starts receiving content. (27) The STT removes the splash screen and starts presenting the content. (28) The STT displays a VCR-function on screen display (OSD) over the content. (29) The STT removes VCR OSD after a predefined time period (e.g., 30 seconds).

Referring now to FIG. 8, the following steps describe the process of initiating the DIVA TV service via an IPG according to one embodiment of the invention:

(1) The Session has already been established. (2) The In band resources have already been assigned to the STT. (3) The STT is tuned to a digital broadcast channel containing a TS IPG screen. (4) The viewer selects one of the DIVA TV programs from the IPG screen. (5) The STT extracts the screen name and matching list index from the IPG data stream. (6) The STT tunes to the appropriate in-band transport stream. (7) The STT displays DIVA splash screen. (8)

The STT sends the NAS a list selection indication containing the screen name and list index. (9) The NAS uses the screen name and list index to determine the desired title and play list. (10) The NAS sends a Decode message to STT. (11) The NAS sends a Create Stream command to the SVM, commanding the SVM to start streaming the selected title in play mode from the start of the title. (12) The NAS sends the SVM a Change Stream command, commanding the SVM to queue up the next title in the play list (if any). (13) The STT starts receiving content. (14) The STT removes the splash screen and starts presenting the content. (15) The STT displays VCR OSD over the content. (16) The STT removes VCR OSD after a predefined time period (e.g., 30 seconds).

Referring now to FIG. 9, the following steps describe the process of initiating the DIVA Capture TV service via a Navigator interface according to one embodiment of the invention:

(1) The Session has already been established. (2) The In band resources have already been assigned to the STT. (3) The Viewer initiates Navigator by pressing a button (e.g., the 'A' button) on the remote control device. (4) The STT tunes to the in band transport stream and start receiving Navigator content. (5) The Viewer navigates to a DIVA TV or Capture TV list screen. (6) The Viewer selects a DIVA TV or Capture TV title. (7) The STT sends the NAS a list selection indication containing the list index for the selected title. (8) Optionally, where high latency may be present, a splash screen is displayed to mask the latency. Where the Capture TV is a subscriber-based service, the latency it typically quite low. (9) The NAS uses the list index to determine the desired title and play list. (10) The NAS sends Decode message to STT. (11) The NAS sends a Change Stream command to the SVM telling it to start streaming the selected title in play mode from the start of the title. (12) The NAS sends the SVM a Change Stream command to queue up the next title in the play list (if any). (13) The STT starts receiving content. (14) The STT removes the optional splash screen (if utilized) and starts presenting the content. (15) The STT displays VCR OSD over the content. (16) The STT removes VCR OSD after a predefined time period (e.g., 30 seconds).

Referring now to FIG. 10, the following steps describe the process of managing DIVA TV windows according to one embodiment of the invention:

(1) The CM has already initialized the NAS. (2) The CM has already loaded initial NAV lists. (3) The TSS has already provided the IPG system with the Capture Plan schedule information. (4) The IPG System determines that it is time to update the IPG screens and data stream. (5) The IPG System determines which titles should be displayed in the IPG list screen based on the DIVA TV Capture Plan schedule information. (6) The IPG System builds a new screen based on the scheduled titles to be available. (7) The IPG System extracts list indices for those titles from the DIVA TV Capture Plan schedule information. (8) The IPG system broadcasts the new screen along with a matching data stream containing the screen name and list indices. (9) The CM determines that the time shift Title Plan schedule calls for a list update. (10) The CM removes any expired title from the NAV list and the play list. (11) If a new title is expected, the CM waits until it has received a set of Retrieve Title Progress messages indicating that the first extent has been written for all tracks in the title. (12) When all expected progress messages have been received, the title is added to the NAV list and play list. (13) The updated NAV list and play list is sent to the NAS. (14) The NAS provides the updated list information for all new STT requests for that list screen. (15) All STTs presenting the old list screen will continue to present that screen until either a selection is made or the screen times out. (16) Any title selected from the old NAV list will be considered in window at the time selected for the purposes of sending the initial title streaming command. (17) Only titles in the new play list will be considered when determining what Change Stream commands should be queued in support of play list processing.

The methods described above with respect to FIGS. 4-10 may be modified by those skilled in the art informed by the teachings of the present invention. It should be noted that unless otherwise indicated, any of the sequences or method steps may be reordered. That is, the above diagrams should not be construed as limiting the various steps to the temporal order indicated in the FIGS. For each indicated step, it is only necessary that the steps specifically required to precede that step are performed first. Thus, the inventors contemplate that the various functions described above may be performed using any of a plurality of step orders.

In one embodiment, the above referenced splash screens include an on screen display with program title, broadcast time, duration and the like. In the case of the "pause" splash screen, a freeze frame of the last presented frame is displayed with, optionally, program title, broadcast time, duration and the like.

In one embodiment of the invention, the ad detection and indexer 176 enables a "news-on-demand" service is provided in which content received from news providers is indexed according to key words or other indexing techniques. The indexing of such content facilitates a search and indexing feature within the time-shift television system. The search and indexing feature allows, for example, a Capture TV subscriber to capture only those news stories associated with a desired topic, such as the news stories related to a particular country, hobby, person, industry and the like. The indexing may also be performed according to various news categories, such as sports, politics, national news, world news and the like. In one embodiment of the invention, the keyword indexing is performed as content is stored, such that non-desired content may be skipped and, therefore, server resources are conserved. In another embodiment, the indexing of content is performed after storage on the server.

The keyword indexing of content for the news on demand service may be performed using closed captioned or extended data service information included within a broadcast content stream. The indexing may also be performed by analyzing the content itself, such that character-representative imagery within the video content stream is detected and associated with corresponding keyword search terms.

The above-described methods, systems and apparatus for providing a server-based time shift television service offer significant advantages over the existing client-based techniques. For example, server-based time shift television are capable of storing vastly larger amounts of content. For example, instead of a 60 hour TIVO storage of a single channel at a predefined quality level, the prensent invention will store, in one embodiemnt, 48 hours of each of hundreds of channels.

Although various embodiments which incorporate the teachings of the present invention have been shown and described in detail herein, those skilled in the art can readily devise many other varied embodiments that still incorporate these teachings.

What is claimed is:

1. A method, comprising:
   presenting a program guide identifying titles of audiovisual data and identifying a set start time and a provided stop time for each of the identified titled audiovisual data presented in the program guide;

receiving a request for recording one of the identified titled audiovisual data selected from the program guide prior to the set start time associated with the one of the identified titled audiovisual data selected from the program guide;

determining from metadata whether the selected one of the identified titled audiovisual data has a known duration defined by the set start time and the provided stop time or has an unknown duration wherein the stop time is tentative and an actual stop time is not communicated to a set-top box;

when the selected one of the identified titled audiovisual data is determined from the metadata to have a known duration, allocating sufficient memory to record the selected one of the identified titled audiovisual data having the known duration;

when the selected one of the identified titled audiovisual data is determined from the metadata to have the unknown duration wherein the stop time is tentative and the actual stop time is not communicated to the set-top box:

receiving, at the set-top box, the selected one of the identified titled audiovisual data presented in the program guide as tracks divided into sequential extents representing sections of the selected one of the identified titled audiovisual data;

allocating a portion of storage space for recording a received extent of the selected one of the identified titled audiovisual data;

determining whether the received extent is a last extent of the selected one of the identified titled audiovisual data;

when the received extent is determined not to be the last extent, determining whether a predetermined part of the allocated memory is consumed by recording the received extent of the selected one of the identified titled audiovisual data;

when a predetermined part of the allocated memory is determined to be consumed, allocating a next portion of memory;

when the received extent is determined to be the last extent, terminating the recording of the selected one of the identified titled audiovisual data after the last extent is recorded; and deallocating any of the allocated memory remaining after terminating the recording of the selected one of the identified titled audiovisual data.

2. In a system adapted to receive broadcast content on a desired transmission channel from each of a plurality of content sources and forward said received broadcast content to a transport network for distribution to subscribers, a method comprising:

in response to a title plan generated by a time shift scheduler, wherein said title plan includes information identifying a plurality of content and designating a set start time and a provided stop time for each of the identified plurality of content, receiving a request for recording one of the plurality of content selected from the title plan prior to the set start time associated with the selected content;

determining from metadata whether the selected content has a known duration defined by the set start time and the provided stop time or has an unknown duration wherein the stop time is tentative and an actual stop time is not communicated to a set-top box;

when the selected content is determined from the metadata to have a known duration, allocating sufficient memory to record the selected content having the known duration;

when the selected content is determined from the metadata to have the unknown duration wherein the stop time is tentative and the actual stop time is not communicated to the set-top box:

receiving, at the set-top box, the selected content as tracks divided into sequential extents representing sections of the selected content;

allocating a portion of storage space for recording a received extent of the selected content;

determining whether the received extent is a last extent of the selected content;

when the received extent is determined not to be the last extent, determining whether a predetermined part of the allocated memory is consumed by recording the received extent of the selected content;

when a predetermined part of the allocated memory is determined to be consumed, allocating a next portion of memory;

when the received extent is determined to be the last extent, terminating the recording of the selected content after the last extent is recorded; and deallocating any of the allocated memory remaining after terminating the recording of the selected content.

3. The system of claim 2, further comprising:
forwarding to said transport network only the received plurality of content presently requested by any subscriber.

4. The system of claim 2, further comprising:
storing, in said server, the plurality of content presently requested by a threshold number of subscribers.

5. The system of claim 4, wherein said storing of the desired plurality of content comprises storing a temporally sub-sampled version of the desired plurality of content to generate a fast-forward track.

6. The system of claim 4, wherein said storing of said desired plurality of content comprises storing a temporally sub-sampled version of the desired plurality of content in reverse order to generate a reverse track.

7. The system of claim 4, wherein said storing of said desired plurality of content comprises storing a version of the desired plurality of content to generate a play track.

8. The system of claim 2, further comprising, storing selected plurality of content during a predetermined time interval of a broadcast schedule.

9. The system of claim 2, wherein said subscriber request for temporally shifted content is initiated by receiving a subscriber title selection from a time shift interactive programming guide screen.

10. The system of claim 2, wherein said subscriber request for temporally shifted content is initiated by receiving a subscriber title selection from a time shift navigation screen.

11. The system of claim 2, wherein said subscriber request for temporally shifted content is initiated by receiving a pause or rewind subscriber selection while broadcasting of said desired plurality of content.

12. A method for providing video information in an interactive information distribution system to a plurality of subscribers, comprising:

receiving a plurality of scheduled broadcast programs at a set-top box on a desired transmission channel in real-time;

selecting a portion of said broadcast programs according to a title plan generated by a time shift scheduler, wherein said title plan includes information identifying a plurality of content and designating a set start time and a provided stop time for each of the identified plurality of content, wherein at least one of said plurality of content has a known duration defined by the set start time and the provided stop time and at least one of said plurality of content has an unknown duration wherein the stop time is tentative and an actual stop time is not communicated to the set-top box;

processing said selected broadcast programs into temporally adjusted content, such that the temporally adjusted content is associated with said selected broadcast programs;

in response to receiving a request for recording content having the unknown duration selected from the title plan prior to a start time for the selected content having the unknown duration, storing dynamically said selected content by:

receiving, at the set-top box, the selected content having the unknown duration as tracks divided into sequential extents representing sections of the selected one of the identified titled audiovisual data;

allocating a portion of storage space for recording a received extent of the selected content having the unknown duration;

determining whether the received extent is a last extent of the selected one of the identified titled audiovisual data;

when the received extent is determined not to be the last extent, determining whether a predetermined part of the allocated memory is consumed by recording the received extent of the selected content having the unknown duration;

when a predetermined part of the allocated memory is determined to be consumed, allocating a next portion of memory;

when the received extent is determined to be the last extent, terminating the recording of the selected content having the unknown duration after the last extent is recorded; and deallocating any of the allocated memory remaining after terminating the recording of the selected content having the unknown duration;

broadcasting said selected content to said plurality of subscribers via said desired transmission channel; and in a first mode of operation, associating a temporal parameter to said selected content having a variable duration extending beyond the set stop time and streaming, on-demand, said selected content having the variable duration extending beyond the set stop time and said temporal parameter to those subscribers viewing said selected content, such that said subscribers may interactively activate such selected content having the variable duration extending beyond the set stop time contemporaneously with currently broadcast programs.

13. The method of claim 12, further comprising:
providing a navigator list to said subscribers having screens presenting said selected content for viewing and selection,
wherein in an alternate mode of operation, streaming, on-demand, said selected content via said navigator list, such that said subscribers may interactively activate such selected content during viewership of previously scheduled broadcast programs selected from said navigator list.

14. The method of claim 13, wherein said subscribers may interactively switch between said first mode of operation and said alternate mode of operation.

15. The method of claim 12, wherein said selecting step comprises:
monitoring subscriber viewership; and
selecting those broadcast programs having a viewership exceeding a predetermined metric.

16. The method of claim 12, wherein said selecting step further comprises:
generating title plans for identifying the content to be temporally adjusted; and
defining a temporal availability window for each program.

17. The method of claim 16, wherein said processing step comprises:
generating real-time encoded play tracks, fast-forward tracks, rewind tracks, and entry point data (EPD) files associated with each track, said fast-forward tracks and rewind tracks forming temporally adjusted content.

18. The method of claim 17, wherein said processing step further comprises:
encoding said content identified in said title plan to form said temporally adjusted content; and
buffering said encoded content.

19. The method of claim 18, wherein said processing step further comprises:
receiving packetized transport streams from at least one encoder; and
inserting title identification codes (TICS) to each packet to enable said packetized transport streams to be identified as said real-time encoded play tracks, fast-forward tracks, and rewind tracks.

20. The method of claim 19, further comprising:
generating said EPD files as said fast-forward and rewind tracks are being created.

21. The method of claim 20, wherein said EPD files provide transition between streaming of the Play, fast-forward and rewind tracks at appropriate points in response to user commands.

22. The method of claim 12, wherein said first mode of operation further comprises providing an interactive program guide (IPG) to said subscribers having screens presenting said selected content having the temporally adjusted content for viewing and selection.

23. The method of claim 12, wherein said first mode of operation further comprises receiving a temporal control message from a subscriber selected from the group of temporal control messages consisting of pause, rewind, and fast-forward.

24. A system for providing video information in an interactive information distribution system to a plurality of subscribers, comprising:
means for receiving a plurality of scheduled broadcast programs on a desired transmission channel in real-time;
means for selecting a portion of said broadcast programs according to a title plan generated by a time shift scheduler, wherein said title plan includes information identifying a plurality of content and designating a set start time and a provided stop time for each of the identified plurality of content, wherein at least one of said plurality of content has a known duration defined by the set start time and provided stop time and at least one of said plurality of content has an unknown duration wherein the stop time is tentative and an actual stop time is not communicated to a set-top box;

means for processing said selected broadcast programs into temporally adjusted content, such that the temporally adjusted content is associated with said selected broadcast programs;

in response to receiving a request for recording content having the unknown duration selected from the title plan prior to a start time for the selected content having the unknown duration, means for storing dynamically at the means for receiving, in response to receiving the request for recording the content selected from the title plan prior to the start time for the selected content, said selected content having the unknown duration for later access by subscribers, wherein storing dynamically comprises:

receiving, at the set-top box, the selected content having the unknown duration as tracks divided into sequential extents representing sections of the selected one of the identified titled audiovisual data;

allocating a portion of storage space for recording a received extent of the selected content having the unknown duration;

determining whether the received extent is a last extent of the selected one of the identified titled audiovisual data;

when the received extent is determined not to be the last extent, determining whether a predetermined part of the allocated memory is consumed by recording the received extent of the selected content having the unknown duration;

when a predetermined part of the allocated memory is determined to be consumed, allocating a next portion of memory;

when the received extent is determined to be the last extent, terminating the recording of the selected content having the unknown duration after the last extent is recorded; and deallocating any of the allocated memory remaining after terminating the recording of the selected content having the unknown duration;

means for broadcasting said selected content to said plurality of subscribers via said desired transmission channel; and in a first mode of operation, means for associating a temporal parameter to said selected content having a variable duration extending beyond the set stop time and streaming, on-demand, said selected content having the variable duration extending beyond the set stop time and said temporal parameter to the subscribers viewing said selected content, such that said subscribers may interactively activate such selected content having the variable duration extending beyond the set stop time contemporaneously with currently broadcast programs.

\* \* \* \* \*

UNITED STATES PATENT AND TRADEMARK OFFICE
CERTIFICATE OF CORRECTION

PATENT NO. : 8,352,988 B2
APPLICATION NO. : 09/994583
DATED : January 8, 2013
INVENTOR(S) : Cleary et al.

Page 1 of 1

It is certified that error appears in the above-identified patent and that said Letters Patent is hereby corrected as shown below:

In the Claims:

Col. 20, line 35, claim 4: "in said sever, the plurality" should read --in said system, the plurality--

Col. 22, line 64, claim 24: "time and provided stop time" should read --time and the provided stop time--

Signed and Sealed this
Thirtieth Day of July, 2013

Teresa Stanek Rea
*Acting Director of the United States Patent and Trademark Office*